March 11, 1952 J. NEUROTH 2,589,019
VALVE OPERATING MEANS
Filed July 20, 1945 2 SHEETS—SHEET 1

INVENTOR.
JOHN NEUROTH
BY Bodell and Thompson
ATTORNEYS.

March 11, 1952
J. NEUROTH
2,589,019
VALVE OPERATING MEANS
Filed July 20, 1945
2 SHEETS—SHEET 2
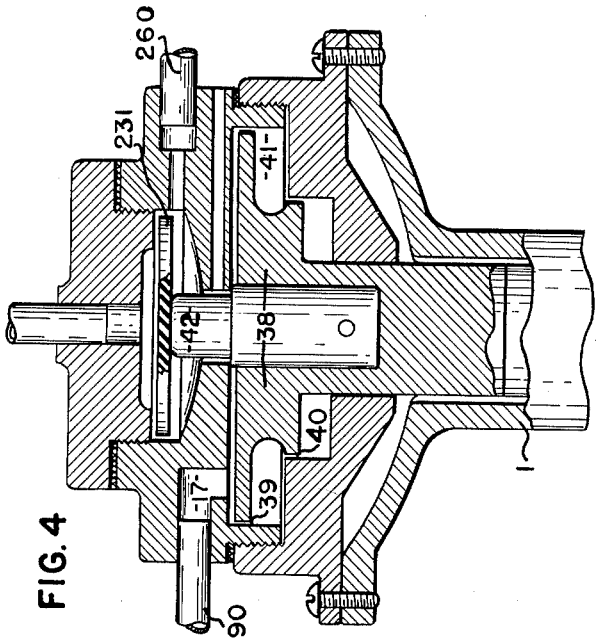
FIG. 4
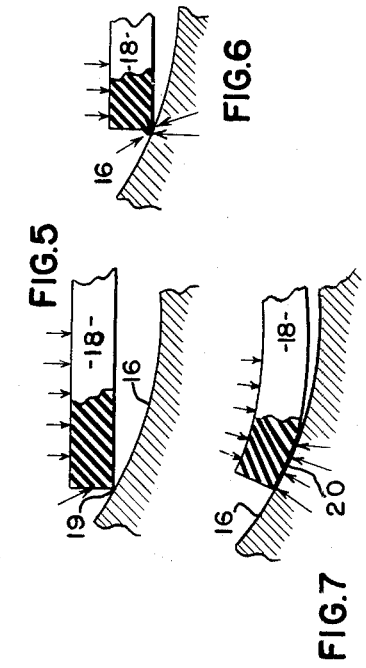
FIG.5
FIG.6
FIG.7
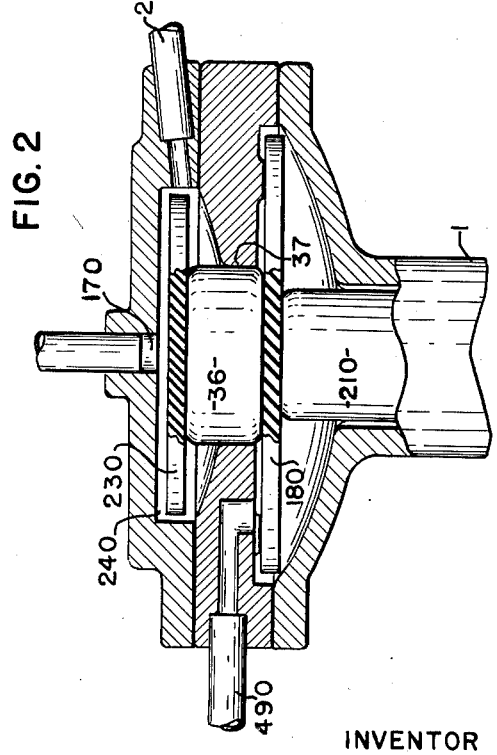
FIG. 2
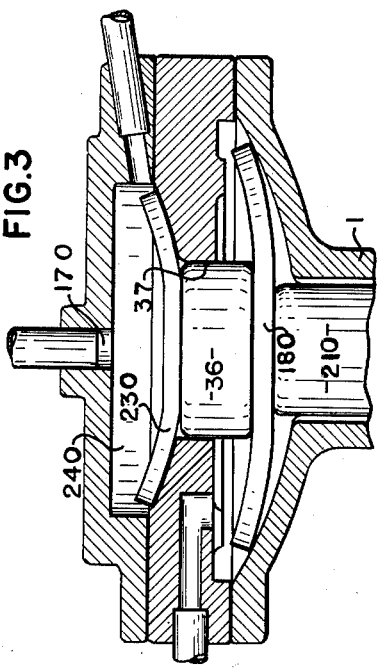
FIG. 3
INVENTOR
JOHN NEUROTH
BY Bodell and Thompson
ATTORNEYS.

Patented Mar. 11, 1952

2,589,019

UNITED STATES PATENT OFFICE 2,589,019

VALVE OPERATING MEANS

John Neuroth, Syracuse, N. Y., assignor to The Prosperity Company, Inc., Syracuse, N. Y., a corporation of New York Application July 20, 1945, Serial No. 606,052

1 Claim. (Cl. 137—153)

This invention relates to valves, and particularly to means for operating a valve by fluid pressure, as air pressure, and holding the valves in their operated position, when the pressure tending to operate them is discontinued.

The invention further has for its object an operating and holding means which includes at least one disk which is flexible and resilient, free at its edge, so as to first engage at the corner of its edge with an opposing concave wall or seat in the pressure chamber in which it is located and then flexes into position to conform to the concave wall.

The invention further has for its object operating holding means including two disks, one or both of which are resilient and flexible, each located in its own pressure chamber, one functioning to initially operate or open the valve, and the other to hold the valve open, the latter being essentially flexible, resilient and also cooperating with an opposing concave wall or seat of the pressure chamber to flex to conform thereto, and in so doing, hold the valve opening disk in its operated position, until the pressure in the pressure chamber for the holding disk is discontinued or released.

The invention consists in the novel features and in the combinations and constructions hereinafter set forth and claimed.

In describing this invention, reference is had to the accompanying drawings in which like characters designate corresponding parts in all the views.

Figures 2 and 3 are fragmentary views of a modified form of the valve operating means shown in Figure 1, the disks being shown in their starting position in Figure 2 and in their operated position in Figure 3.

Figure 4 is a view similar to Figure 2 of a second modified form in which the pressure operated disk for operating the valve is shown, as an inflexible one, instead of a flexible one.

Figures 5, 6 and 7 are, respectively, fragmentary operation views showing the operation of the flexible disk at the start of its sealing movement and intermediate of its sealing movement and with full pressure applied.

Figure 1:
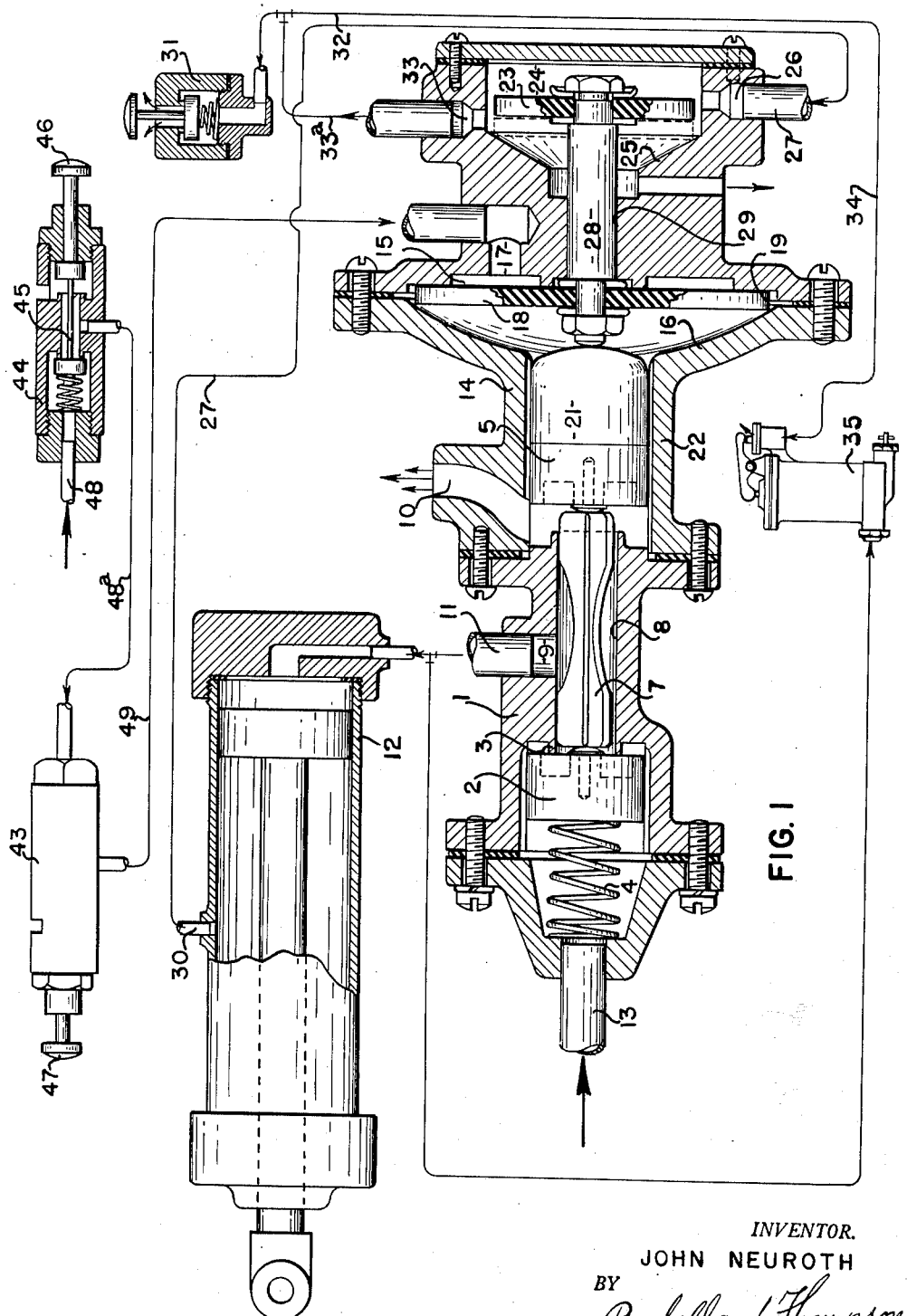
Figure 1 is a longitudinal sectional view of a valve structure embodying this invention, the contiguous portion of the machine with which the valve is associated and the operating manuals therefor being also shown.

This invention resides generally in pressure operated means for devices, as valves and the like, which operating means includes a flexible disk free at its margin and operable under pressure of a motive fluid, as air, to engage at its outer free margin with a concave wall of the chamber in which the disk is located, and then flex so that the margin flexes to conform to the concave wall to hold the pressure, the movement of the disk operating the valve and/or holding the valve in its operated position, until the holding pressure is released. Two flexible disks may be used, one for operating or opening the valve, and the other for holding it in operated position, or one only of these disks, as the holding disk, may be flexible and resilient, or one flexible resilient disk may perform both the function of operating or opening the valve and of holding it in operated position.

The invention is here shown as applied to the master valve for controlling the flow of motive fluid to the cylinder and single-acting piston servomotor of a machine having a closing and opening movement during each reciprocation of the piston, as for instance, a garment and laundry pressing machine in which the flow of air to effect the closing is controlled by a two hand control mechanism.

I designates the casing of the valve and 2 the movable intake valve member, as a sliding head coacting with its seat 3 and pressed against its seat by a returning spring 4. This spring and main line pressure also performs the function of returning the valve operating disk or parts to their initial position when holding pressure or force is released. 5 is an exhaust valve head for coacting with a seat 6 in the casing, this being operated in synchronization with the head 2, so that the two heads 2 and 5 constitute a combined intake and exhaust valve. Usually, these heads are connected by a stem but as here shown, a floating spacer 7 is interposed between the heads 2 and 5 and guided in a chamber 8 having a transfer port 9 and an exhaust port 10. The valve heads 2 and 5 are normally arranged to close the flow of air through the intake and open the exhaust port 10. The transfer port 9 is connected by a pipe 11 to a port in the head of the cylinder 12 of the servomotor. The casing 1 is connected by an intake pipe 13 to a source of supply of pressure fluid, as air. The casing 1 is here shown as provided with an extension 14 formed with a pressure chamber 15 having a concave wall 16 on one side thereof and with an inlet port 17, which is connected to the source of air supply, usually through a two hand control.

In the form shown in Figure 1, the means for operating the valve head 5 to closed position comprises a flexible resilient disk 18 in the pressure chamber 15 so located that the blast of air coming in through the port 17 first thrusts the disk 18 to carry the corner of its free edge 19 (Figure 5) against the concave wall 16, then slightly compresses it, as shown in Figure 6, and flexes the disk so that its margin conforms to the curve of the concave wall at 20, as shown in Figure 7. This flexing of the disk 18 operates the valve heads 2 and 5 to open and closed position, respectively, through a spacer 21 slidable in a passage 22 in the casing 14, in which passage the exhaust head 5 is also guided. The movement of the exhaust valve head 5 is transferred through the spacer 7 to the intake valve head 2 against the action of the returning spring 4 and main line air pressure, which re-sets the valve head when the pressure in the chamber 15 is released or when the disk 18 is free of any means for holding it in its operated position.

In the illustrated embodiment of the invention, the means for holding the valve heads in their operated positions also holds the disk 18 in its flexed position, when the pressure in the chamber 15 is released. This holding means is here shown as a second disk 23 located in a pressure chamber 24 having a concave wall 25 opposed to the second disk 23. This chamber has an intake port 26 to which a pipe 27 is connected. When the air is free to flow through the pipe 27, the disk 23 is flexed into position similar to that shown in Figure 7. In Figure 1, the disks 18 and 23 are shown as connected together at their centers by a stem or rod 28 slidably fitting in a passage 29 in the casing. As the disks are connected together, the disk 23 is moved into the dotted line position (Figure 1), when air pressure enters the chamber 15 to flex the disk 18, so that the pressure of the air entering the chamber 24 through the port 26 is effective on one side, as the right hand side only of the disk 23. The flow of air through pipe 27 to the port 26 is controlled by the operation of the machine with which the valve is associated, that is, when the machine is closed or has closed a predetermined amount, such closing of the machine controlling means for establishing communication between the pipe 27 and the source of air. As here shown, the pipe 27 is connected to a port 30 in the side of the cylinder 12 and located to be uncovered by the piston, when the piston has traveled a predetermined distance on its power stroke.

To effect the closing of the intake valve head 2 and the opening of the exhaust valve head 5, a normally closed release valve 31 is in communication with the pressure chamber 24 through pipes 32, 33a and a release port 33. Also, the port 33 may be connected in multiple, as by a pipe 34, with a timer operated release valve or with a remote control release valve designated generally 35. A group of machines is sometimes operated by one operator and the opening of one machine is controlled by the closing of another machine, or vice-versa, in order to save operating time.

In the form shown in Figures 2 and 3, the disks 180 and 230 are shown as floating or as entirely free, or not connected at their centers, as by the stem 28 (Figure 1), but the motion of the holding disk 230 is transferred to the disk 180, or the disk 230 follows up the operating disk 180, through a spacer 36 slidably fitting a passage 37 in the casing. In this construction, the disk 230 is biased to cause it and the spacer 36 to follow up the disk 180, in order that only one side of the disk 230 be exposed to the pressure through the port 260 in the chamber 240. In the construction shown, the biasing of the disk 230 is effected by gravity. When the disk 180 is operated from the position shown in Figure 2 to that shown in Figure 3 by air entering through the pipe 490, the spacer 36 follows by gravity and the disk 230 follows the spacer, bringing the corner at its edge in engagement with the concave wall of the pressure chamber 240. The biasing may be done in any other manner, as by a light spring.

In Figure 4, the operating disk 38 is shown as inflexible, usually metallic, and slidably fits at 39 and 40 cylindrical walls in the pressure chamber 41, with sufficient tightness to initially prevent, or with not enough clearance to permit, the passage of air around the edge of the disk when the port 17 is open for the intake of air through pipe 490. The disk is, however, held in its operated position by a flexible disk 231, the motion of which is transferred to the disk 38 through a stem 42 on which the metal disk 38 is mounted. The inflexible disk 38 at its periphery fits within its chamber at 39 and 40 with such little clearance that air can not pass around it, or the disk acts as a piston without piston rings.

The flow of air to the port 17 is controlled by two hand control valves of the combined intake and exhaust type. 43 and 44 designate these valves, each including a combined intake and exhaust valve member 45 operated by a manual or push button 46 or 47. These valves are connected in series with the intake pipes 48 and 48a and the second valve 43 in the series is connected by a pipe 49 to the intake port 17. Upon the operation of both valves in the same operation, air will flow to the intake port 17 to actuate the disks 18 or 180 (Figures 1, 2 and 3), or the disk 38 (Figure 4), closing the exhaust valve head 5 and opening the intake valve head 2, against the action of the returning spring 4 and air line pressure. Air then flows from the intake pipe 13 past the valve head 2 and chamber 8 through the port 9 and pipe 11 to the cylinder 12 to actuate the piston therein. When the piston has traveled a predetermined distance on its power stroke, it uncovers the port 30 and air passes from the cylinder through the pipe 27 to the port 26 of the chamber 24 in which the holding disk 23 is mounted, pressing said disk 23 to the left into sealing position against the concave wall 25 of its pressure chamber, thus locking the valve heads 2 and 5 in their operated position. The disk 23 has just previously been shifted against concave wall 25 by the action of the closing disk 18 and the stem 28. The manuals 46, 47 must be held depressed until the piston passes the port 30. After the piston does pass the port 30 and the holding disk 23 is operated, the manuals may be released. Upon opening of the release valve 31, air will exhaust from the pressure chamber 24, through port 33, pipes 33a and 32, for the holding disk 23, permitting the spring 4 to react and return the valve heads 2 and 5 and the disks 18, 230, 180 (or 38) and the disk 23 to starting position.

Operating and holding means for valves in this situation have heretofore been diaphragms held at their margins. Leakage developed and also the diaphragms became faulty, cracked or perforated, due to the fact that they were clamped or held at their margins. By forming the disks free at least at their margins, cracking of the disks due to flexing is avoided and also a perfect seal is easily obtained between the margin of the disk and the concave wall of the pressure chamber in which it is located. Also, disks free at their margins are more economical to manufacture and install and are long-lived. As the disks are free to seat on the concave wall, no stretching results when pressure is applied.

What I claim is:

In a valve, a casing having an inlet, an outlet for a motive fluid and an exhaust passage, a movable valve member in the casing having heads initially in position to close the casing to the inlet of motive fluid and to open the casing to the exhaust of motive fluid, the casing being formed with a pressure chamber having an intake port for a fluid under pressure, a normally closed, self-closing manually operable valve controlling the flow of motive fluid through said port into the pressure chamber, means for operating the valve member comprising a disk in the pressure chamber, the chamber having a wall constituting a seat on which the disk seats when the port is open, the disk having its circumferential edge free and movable by the motive fluid pressure coming through said port towards its seat, means for transferring the movement of the disk to said valve member to operate it to open the intake head and close the exhaust head, the casing being formed with a second pressure chamber having an intake port and a concave wall constituting a seat for the second disk and an intake port, a second disk in the second pressure chamber, the second disk being flexible and resilient free at its edge and movable into position where it presses its edge toward the concave wall of the second chamber and flexes to conform to the concave wall under pressure through the second port a motion transmitting means between the first and second disks to initially transfer the movement of the first disk toward the concave wall of the first chamber and shift the second disk toward the concave wall of the second chamber, the valve member in the casing being acted upon by spring means tending to close the intake head and open the exhaust head thereof and hence return the disks to their initial starting position, the second chamber having a valve controlled release port to release the pressure in the second chamber and permit the valve member to be actuated by its spring means when the first intake port is closed, and means for transferring the flexing movement of the second disk to the first disk.

JOHN NEUROTH.

REFERENCES CITED

The following references are of record in the file of this patent:

UNITED STATES PATENTS

| Number | Name | Date |
| --- | --- | --- |
| 1,454,547 | Lane | May 8, 1923 |
| 2,071,749 | Knight | Feb. 23, 1937 |
| 2,255,322 | Langdon | Sept. 9, 1941 |
| 2,291,243 | Levy | July 28, 1942 |
| 2,341,696 | Davis | Feb. 15, 1944 |
| 2,346,829 | Davis | Apr. 18, 1944 |